March 24, 1936.  F. F. WILKINS  2,034,733
MEASURING SPOON
Filed June 23, 1934
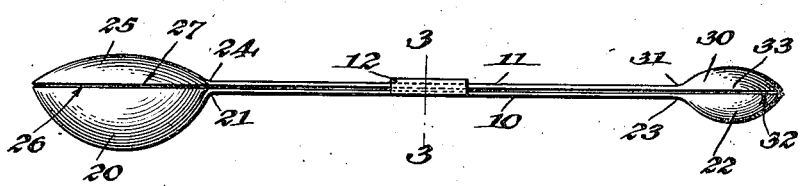
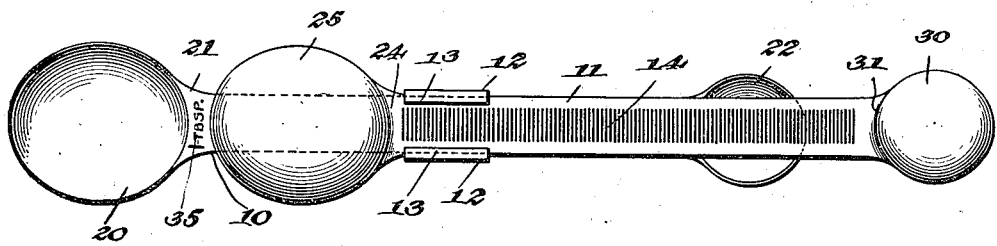
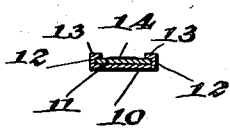
WITNESS
INVENTOR
Frances F. Wilkins,
BY
ATTORNEYS Patented Mar. 24, 1936

2,034,733

UNITED STATES PATENT OFFICE 2,034,733

MEASURING SPOON

Frances F. Wilkins, Lynchburg, Va.

Application June 23, 1934, Serial No. 732,175

1 Claim. (Cl. 73—62)

This invention relates to measuring spoons.

An object of the invention is the provision of self-leveling measuring spoons which are slidably mounted upon each other with the spoons having different capacities, with the spoons being in pairs so that one of the spoons will always co-operate with the spoon measuring materials for leveling off the materials.

An object of the invention is the provision of a multiple spoon measure in which a plurality of receptacles of different capacities are slidably mounted upon each other.

A further object of the invention is the provision of a multiple spoon measure in which a pair of handles are slidably mounted upon each other, a receptacle being connected to each end of the handles, the receptacles being of different capacities and slidable over each other for leveling off the material in one of the receptacles.

A still further object of the invention is the provision of a multiple spoon measure in which a plurality of receptacles of different capacities are slidably mounted upon each other with the receptacles being so arranged that they may be operated by one hand for moving one of the receptacles over the other receptacle to level off the materials in an associated receptacle, the measuring and leveling being done within the container housing the ingredients.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claim.

In the drawing:

Figure 1 is a side view of the multiple spoon measure constructed in accordance with the principles of my invention, Figure 2 is a plan view of the same, and Figure 3 is a transverse vertical section taken along the line 3—3 of Figure 1.

Referring more particularly to the drawing, 10 designates a handle which may be defined as the base member upon which a second handle 11 is slidably mounted. It will be noted that the handles are approximately the same width and length.

The handle 10 is provided with upturned flanges 12 formed integrally therewith and the outer ends of these flanges are inturned, as shown at 13, to provide guide members to receive the handle 11 and maintain said handle in operative position on the handle 10. The flanges 12 are of sufficient length and neatly receive the handle 11 in order to prevent lateral displacement of said handle on the handle 10.

An inspection of Fig. 2 discloses that the outer surface of the handle 11 is provided with closely associated and transversely disposed depressions or ribs 14 in order to provide a knurled surface so that it may be engaged by the thumb of the operator for slidably moving the handle 11 on the handle 10 for a purpose which will be presently explained.

A receptacle 20 in the shape of a bowl of a spoon is formed integrally with one end 21 of the handle 10 and this receptacle has the capacity of one tablespoon.

A receptacle 22 is formed integral with the other end 23 of the handle 10 and has the capacity of a half of a teaspoon when the material that is housed in the receptacle 22 has been leveled off.

At one end 24 of the handle 11 is formed integrally a receptacle 25 having the capacity of one teaspoon. This receptacle is in the shape of a bowl of a spoon and has its peripheral edge 27 in substantially the same plane as the peripheral edge 26 located at the open face of the receptacle 20. While the receptacle 20 has substantially the same area at its open portion as does the receptacle 25, it will be found that the depth of the receptacle 20 is greater than the receptacle 25 and this greater depth determines the greater capacity of the receptacle 20.

A receptacle 30 is formed at the opposite end 31 of the handle 11 and is in the shape of the bowl of a spoon. This receptacle has the capacity of a quarter of a teaspoon. The area at the periphery 32 of the open portion of the receptacle 22 is substantially equal to the area at the periphery 33 at the open portion of the receptacle 30 so that the peripheries 32 and 33, respectively, of the receptacles 22 and 30 coincide in the same manner as the peripheries of the receptacles 20 and 25 for a purpose which will be presently explained.

While the area of the open portion of the receptacle 22 is substantially the same as that of the open portion of the receptacle 30 the depth of the bowl 22 is greater than the depth of the bowl 30 and this depth determines the greater capacity of the bowl 22.

From the above construction it will be found that when the handles 10 and 11 are moved in slidable relation with respect to each other that the peripheral portions 26 and 27, respectively, of the receptacles 20 and 25 are moved over each other. In a like manner the peripheral portions 32 and 33, respectively, of the receptacles 22 and 30 are likewise moved over each other.

On the end 21 of the handle 10 and adjacent the open portion of the bowl 20 is provided indicia 35 which indicates to the operator the capacity of the spoon. Thus it will be seen that 1-tbsp. indicates that the capacity of the receptacle 20 is one tablespoon. In a like manner the outer ends of the handles that are connected to the receptacles are marked with the indicia in any approved manner, indicating respectively the capacities of the various spoons or receptacles. The spoons are graded as follows: 1 tbsp., 1 tsp., ½ tsp., ¼ tsp. These indications serve to notify the operator promptly of the capacities of the various receptacles.

The construction of the spoon provides for ease and simplicity of operation so that it is only necessary for the operator to employ one hand for reciprocating the handles 10 and 11 on each other after one of the containers has been filled with material. Since it is only necessary to use one hand for the manipulation, the other hand may be employed for holding the container. Furthermore, the handles are of sufficient length for placing the spoons inside of a small container to be filled after which the co-operating spoon or receptacle may be moved over the top of the filled spoon to level off the material by the reciprocation of either handle. Thus it will be seen that this construction will prevent spilling of the ingredients.

The convenience of the construction resides in the fact that approximately four individual spoons are retained in a unit and the capacities of the spoons are those ordinarily required in a household.

I claim:

A multiple-spoon measure comprising a pair of elongated handles, a guide means on one handle receiving the other handle and providing a longitudinally slidable mounting for the handles whereby said handles are movable relative to each other, a receptacle at adjacent ends of the handles, said pair of receptacles having open portions in face to face relation and slidable over each other to expose either receptacle, said receptacles being of different capacities the areas and shapes of the open portions of said receptacles being substantially identical so that when the open faces of the receptacles are moved over each other one of said receptacles will form a leveling means for material in the other receptacle.

FRANCES F. WILKINS.